(12) United States Patent
Gomez Gonzalvo et al.

(10) Patent No.: US 12,711,774 B2
(45) Date of Patent: Aug. 18, 2026

(54) SYSTEM AND METHOD FOR PROVIDING A COMPOSITE IMAGE OF A VEHICLE AND ITS SURROUNDINGS

(71) Applicant: Ficosa Adas, S.L.U., Barcelona (ES)

(72) Inventors: Alberto Gomez Gonzalvo, Barcelona (ES); Isaac Agusti Ventura, Barcelona (ES); Rachid Boukir Fatimi, Barcelona (ES); Pablo Gonzalez Martinez, Barcelona (ES)

(73) Assignee: FICOSA ADAS, S.L.U., Barcelona (ES)

( * ) Notice: Subject to any disclaimer, the term of this patent is extended or adjusted under 35 U.S.C. 154(b) by 318 days.

(21) Appl. No.: 18/222,219

(22) Filed: Jul. 14, 2023

(65) Prior Publication Data

US 2024/0020985 A1 Jan. 18, 2024

(30) Foreign Application Priority Data

Jul. 15, 2022 (EP) .................................... 22382678

(51) Int. Cl.
*G06V 20/56* (2022.01)
*B60R 1/27* (2022.01)
(Continued)

(52) U.S. Cl.
CPC ................ *G06V 20/56* (2022.01); *B60R 1/27* (2022.01); *G06V 10/25* (2022.01); *G06V 10/56* (2022.01);
(Continued)

(58) Field of Classification Search
None
See application file for complete search history.

(56) References Cited

U.S. PATENT DOCUMENTS 7,139,412 B2 * 11/2006 Kato ...................... H04N 7/181 348/E7.086
7,684,593 B2 * 3/2010 Chinomi ................ H04N 7/181 382/104

(Continued)

OTHER PUBLICATIONS

Lai, C. et al., "Efficient Photometric Alignment for Around View Monitor System", 2019 IEEE 13th International Conference On ASIC (ASICON), Oct. 29, 2019, 4 pgs.

(Continued)

*Primary Examiner* — John B Strege
(74) *Attorney, Agent, or Firm* — Brooks Kushman P.C.

(57) ABSTRACT

The system comprises a plurality of cameras, wherein a first camera is configured to acquire a first captured image and a second camera is configured to acquire a second captured image, the first captured image and the second captured image being at least partially overlapped; at least one controller configured to receive and combine at least the first captured image and the second captured image for providing the composite image; and the system is configured to define a first region of interest within the first captured image and a second region of interest within the second captured image; and to detect the at least one of a brightness and a color of at least the first and second region of interest to adjust the at least one of the brightness and the color of at least the first and second captured image before being combined.

11 Claims, 3 Drawing Sheets

(51) Int. Cl.

| | |
|---|---|
| ***G06V 10/25*** | (2022.01) |
| ***G06V 10/56*** | (2022.01) |
| ***G06V 10/60*** | (2022.01) |
| ***H04N 23/13*** | (2023.01) |
| ***H04N 23/698*** | (2023.01) |
| ***H04N 23/84*** | (2023.01) |
| ***H04N 23/88*** | (2023.01) |
| ***H04N 23/90*** | (2023.01) |
| ***H04N 23/951*** | (2023.01) |

(52) U.S. Cl.

CPC ............. *G06V 10/60* (2022.01); *H04N 23/13* (2023.01); *H04N 23/698* (2023.01); *H04N 23/84* (2023.01); *H04N 23/88* (2023.01); *H04N 23/90* (2023.01); *H04N 23/951* (2023.01); *B60R 2300/105* (2013.01); *B60R 2300/303* (2013.01); *B60R 2300/304* (2013.01); *B60R 2300/8026* (2013.01); *B60R 2300/8073* (2013.01); *B60R 2300/8093* (2013.01)

(56) References Cited

U.S. PATENT DOCUMENTS

| | | | | |
|---|---|---|---|---|
| 9,533,618 | B2 * | 1/2017 | Zhang | B60R 1/27 |
| 9,598,105 | B2 * | 3/2017 | Sakakibara | B62D 15/027 |
| 9,873,379 | B2 * | 1/2018 | Takaki | B60R 1/27 |
| 10,040,394 | B2 * | 8/2018 | Bassi | H04N 23/698 |
| 10,397,524 | B1 * | 8/2019 | Wu | H04N 7/181 |
| 2002/0047901 | A1 * | 4/2002 | Nobori | G06T 7/97 382/104 |
| 2002/0196340 | A1 * | 12/2002 | Kato | G06T 3/4038 348/E7.086 |
| 2006/0088190 | A1 * | 4/2006 | Chinomi | B60R 1/27 348/E7.086 |
| 2011/0234801 | A1 * | 9/2011 | Yamada | H04N 23/90 348/148 |
| 2012/0002050 | A1 * | 1/2012 | Taniguchi | H04N 7/181 348/148 |
| 2014/0160275 | A1 | 6/2014 | Sakakibara et al. | |
| 2015/0254825 | A1 | 9/2015 | Zhang et al. | |
| 2015/0258936 | A1 * | 9/2015 | Takaki | H04N 23/698 348/148 |
| 2016/0368417 | A1 | 12/2016 | Bassi et al. | |
| 2017/0166126 | A1 * | 6/2017 | Sypitkowski | B60K 35/28 |
| 2019/0138839 | A1 * | 5/2019 | Shimizu | G06V 10/60 |
| 2019/0253623 | A1 * | 8/2019 | Lim | H04N 23/88 |
| 2020/0051222 | A1 * | 2/2020 | Kim | H04N 23/698 |
| 2020/0202488 | A1 * | 6/2020 | Kawaguchi | G06T 5/92 |
| 2020/0391751 | A1 * | 12/2020 | Fujiyoshi | B60W 40/06 |
| 2023/0064558 | A1 * | 3/2023 | Griffin | B60K 35/28 |

OTHER PUBLICATIONS

European Search Report dated Dec. 12, 2022 for European Patent Application No. 22382678.5 filed Jul. 15, 2022, 8 pages.

* cited by examiner 2
12
11
1
5
13
3
6
14
4

PRIOR ART

FIG. 2a

C ROI-1

FIG. 2b

C ROI-2 C y x

FIG. 2c

ROI-3 C

FIG. 2d

ROI-4 C

C
ROI-1

C
ROI-2
C
y
x

ROI-3
C

C
ROI-4
C

SYSTEM AND METHOD FOR PROVIDING A COMPOSITE IMAGE OF A VEHICLE AND ITS SURROUNDINGS

CROSS-REFERENCE TO RELATED APPLICATIONS

This application claims priority to EP application Serial No. 22382678.5 filed Jul. 15, 2022, the disclosure of which is hereby incorporated in its entirety by reference herein.

TECHNICAL FIELD

The present invention relates to a system and a method for providing a composite image of a vehicle, i.e., an image made by combining several distinct images, such as a top view, of a vehicle and its surroundings, which permits to adjust the brightness and/or color of the acquired images forming the composite image.

BACKGROUND

Modern vehicles usually include camera modules and imaging systems for Advanced Driver Assistance Systems (ADAS) applications. ADAS are primarily focused on collision avoidance technologies (for example, lane departure warning and blind-spot applications) and driver aids, such as night vision, driver alertness and adaptive cruise control.

One of the applications within the field of ADAS is that called “top view”, also called “surrounding view”. That is, using a plurality of camera modules, in which there are at least two cameras, one on each side of the vehicle, most preferably a third rear camera, and preferably a fourth frontal camera: one in left (e.g., on the left rearview mirror or winglet), one in front, one on right (e.g., on the right rearview mirror or winglet), and one on the rear.

In certain preset situations, e.g., when the user puts the vehicle in reverse gear, he/she wants the top view (surrounding view) system to be activated and displayed automatically on the screen. That is, a controller is configured to activate the plurality of camera modules and to capture the images. Each of the cameras may be configured to send its image (e.g., video at a frame rate of at least 15 frames per second (fps)) to the controller, which is further configured to process an image that is called “top view” (e.g., converting the image to be viewed from top to bottom) through, for example, a “homography matrix”.

In addition, the controller is configured to do a “stitching”, i.e., stitching, combining, or joining a plurality of images, in particular, joining the four images together. Thus, when the driver or user puts the vehicle in reverse gear, a screen displays, almost instantaneously, an image or video showing the vehicle and its surroundings in a bird’s eye view, from top to bottom. Obviously, the roof, and in general, the upper surface of the vehicle is not captured by any camera and is simply an image stored in the controller.

A “homography matrix” is defined as a way of making an image transformation. That is, “homography”, also called planar homography, is a transformation that occurs between two planes. In other words, it is a mapping between two planar projections of an image. It can be represented by a 3×3 transformation matrix in a homogeneous coordinate space.

One problem with current systems that provide a top view is that each camera module receives a different light level and when stitching, i.e., combining or joining the four images, it is obtained a single top view image with different luminosities.

The different light levels captured are mainly due to environmental factors that are external to the vehicle, e.g., the direction of the light source, e.g., the sun, and to integration factors of each camera.

For example, if the vehicle is facing the sun, the front camera may capture more light, while the rear camera may possibly receive much less light than the front camera.

As for factors of integration of each camera in the vehicle, there are cameras that are more outside the vehicle chassis or more inside, so that normally, to a greater or lesser extent, a portion of the captured image corresponds to the vehicle chassis, or to reflections that the camera receives from the chassis. Nowadays, different vehicle models may have different integrations for the camera. This is, a camera may be mounted on the vehicle at different locations and/or positions based on the vehicle model. For example, a front camera may be arranged at a pre-determined location and/or position in a first vehicle model, whereas the same of very similar front camera may be arranged at second different location and/or position in a second vehicle model. For example, the front camera for the second vehicle model may be mounted further out from the vehicle than the camera on the first vehicle model and, therefore, both captured image may be substantially different even though they are both front cameras with substantially the same or similar properties.

For trying to solve the environmental factors, e.g., US20160368417 A1 discloses a top view system with a plurality of cameras, in which each camera has an image signal processor that includes a geometry and color processing unit that selects a region of interest of the captured image and checks the brightness and color of that region of interest. The processor also adjusts the brightness and color through e.g., an automatic exposure (brightness) and/or an automatic white balance (color).

This system is complex to do in a mass production in the automotive sector since it constantly dynamically adjusts the brightness and color of the image while the vehicle is in operation. In other words, the region of interest disclosed in US20160368417 A1 is dynamic because it moves within the captured image depending on the light level.

Furthermore, the problem with the current systems is that each of the cameras has an identical image algorithm, e.g., automatic exposure and auto white balance. However, the integration and location of each of the cameras is different and, therefore, it may be that each of the cameras has a different exposure to ambient light, i.e., each camera may receive more or less light, and this is a problem, especially when combining a single image with different levels of brightness.

SUMMARY

Therefore, an objective of the present invention is to provide a system and method that provides an improved image brightness/color adjustment to achieve a composite image, such as a top view or surrounding view, of a vehicle with a harmonized and constant brightness and/or color.

With the system and method of the invention said disadvantages are solved, presenting other advantages that will be described below.

The system and method according to the present invention are defined in the corresponding independent claims. The dependent claims include further optional features.

In particular, according to first aspect of the present invention, the system for providing a composite image of a vehicle and its surroundings comprises:

- a plurality of cameras each camera may take a captured image of the surroundings of the vehicle, wherein a first camera may be configured to acquire a first captured image and a second camera may be configured to acquire a second captured image, the first captured image and the second captured image being at least partially overlapped;
- at least one controller may be configured to receive and combine at least the first captured image and the second captured image for providing the composite image;
- wherein the system, preferably, the at least one controller, may be configured to define a first region of interest within the first captured image and a second region of interest within the second captured image; and
- the system, preferably, the at least one controller, may be further configured to detect the brightness and/or color of at least the first and second region of interest for the system (i.e., the at least one controller) to adjust the brightness and/or color of at least the first and second captured image before being combined.

It is preferred that the first region of interest may be different from the second region of interest in size and/or location.

Preferably, the size, shape, and location of the first and second region of interest may be pre-defined out of the operation of the vehicle, this is, the first region of interest and the second region of interest may be determined and loaded (i.e., saved or stored) in a non-operation state of the vehicle (offline), preferably, by the at least one controller.

More preferably, the at least one controller may comprise a composite image processor arranged out of the cameras and electrically connected to the cameras such that, in use, data, including image data, may be sent from the composite image processor to the cameras and vice-versa. Further, the at least one controller may further comprise a control unit inside of each camera (i.e., the control unit being different from the composite image processor).

It is even more preferred that the electrically connection between the composite image processor and the cameras is done through a communication interface, the communication interface being a Controller Area Network (CAN) bus, a Local Interconnect Network (LIN) bus, ethernet, an optical fiber communication, a wireless, a Low-voltage differential signaling (LVDS), or coaxial interface.

More preferably, in use, the first and second region of interest may be pre-defined in size and/or location during the assembly line of the vehicle including any manufacturing/assembling process of the vehicle earlier than the final assembly line (i.e., prior to the operation of the vehicle). This is, at any stage of or prior to the final assembly of the vehicle, the size, geometry, and/or the location of at least the first region of interest and the second region of interest may be determined and subsequently saved (i.e., loaded/flashed) on the composite image processor.

Alternatively, the size, geometry, and/or the location of at least the first region of interest may be saved (or stored) (i.e., loaded/flashed) on the control unit arranged in the first camera, and the second region of interest may be saved (or stored) (i.e., loaded/flashed) on the control unit arranged in the second camera. In other words, the size, geometry, and/or the location of at least the first region of interest and the second region of interest may be determined and subsequently saved (or stored) (i.e., loaded/flashed) on the composite image processor or on the control unit arranged in the first and second camera respectively.

It may be preferred that, in use, the first and second region of interest are invariable in size and/or location during the operation of the vehicle (online). This is, as long as the vehicle is in operation, at least the first region of interest and the second region of interest may be unchangeable in size and/or location. Operation of the vehicle may be understood within the meaning of the present disclosure as the state where the vehicle is in the ON state, for example, the ignition of the vehicle or the start of the motor has been turned on.

Preferably, each region of interest may be defined by coordinates, these coordinates being fixed (not movable within the captured image) after their definition by the at least one controller. More preferably, as explained, the at least one controller is the composite image processor arranged out of the cameras within the vehicle. This is, as long as the vehicle is in operation (online), at least the first region of interest and the second region of interest may not be moved within the first and second captured image respectively. An optimal balance may be achieved between a harmonized composite image in terms of brightness and/or color and computational resources (i.e., number of computational operations performed by the at least one controller). More preferably, in use, the first and second region of interest may be pre-defined (e.g., determined and saved) in size and/or location during the assembly line of the vehicle including any manufacturing/assembling process of the vehicle earlier than the final assembly line (offline).

It may be preferred that at least 70% of both the first region of interest and the second region of interest may include the surroundings of the vehicle. This is, at least 70% of the first region of interest may include an exterior area (i.e., surroundings) of the vehicle. Also, at least 70% of the second region of interest may include an exterior area (i.e., surroundings) of the vehicle.

It may be preferred that less than 30% of the first region of interest includes a portion of the vehicle. This is, the first region of interest does not include more than 30% of a portion of the vehicle. It is more preferred that less than 30% of the second region of interest may include a portion of the vehicle. This is, the second image region does not include more than 30% of a portion of the vehicle. It is even more preferred that less than 30% of any region of interest of the plurality of cameras of the present invention includes a portion of the vehicle. This is, no region of interest of the plurality of cameras of the present invention may include more than 30% of a portion of the vehicle.

More preferably, the first region of interest may include substantially only the surroundings of the vehicle (i.e., no portion of the vehicle). Including substantially only the surroundings of the vehicle may be understood within the meaning of the present disclosure as including less than 20% of a portion of the vehicle in the region of interest, being more preferred, less than 10%. It should be noted that most prior art disclose four regions of interest (one for each camera) each located substantially on the center of the respective captured image, where approximately 40%-60% of each region of interest corresponds to a portion of the vehicle (i.e., not relevant for determining/detecting the level of brightness and/or color).

It may be preferred that the first region of interest may have a size of between 25% to 80% of the first captured image. More preferably, the first region of interest may have a size of between 30% to 60% of the first captured image. Even more preferably, the first region of interest may have a size of between 35% to 55% of the first captured image. Similarly, the second region of interest may have a size of between 25% to 80% of the second captured image. More preferably, the second region of interest may have a size of between 30% to 60% of the second captured image. Even more preferably, the second region of interest may have a size of between 35% to 55% of the second captured image. Further, any region of interest of the plurality of cameras of the present invention may have a size of between 25% to 80% of the first captured image, more preferably, of between 30% to 60%, and even more preferably, of between 35% to 55%. Low accuracy in brightness and/or color detection has been found when a region of interest is smaller than 20% of a captured image.

The system for providing a composite image of a vehicle may preferably be a system for providing a top view of a vehicle and its surroundings. The system may further comprise a third camera configured to acquire a third captured image and a fourth camera configured to acquire a fourth captured image. This is, the system for providing a top view of a vehicle and its surroundings may comprise four cameras (left camera, front camera, right camera, and rear camera).

The captured images may be at least partially overlapped to each other. Just as an example, the first and second captured images may be at least partially overlapped to each other. Further, the second and third captured images may be at least partially overlapped to each other. Additionally, the third and fourth captured images may be at least partially overlapped to each other, and the fourth and first captured images may be at least partially overlapped to each other.

It may be preferred that a distance between a geometric center of the second region of interest and a bottom edge of the second captured image (e.g., associated to the front camera) is smaller than a distance between a geometric center of the fourth region of interest and a bottom edge of the fourth captured image (e.g., associated to the rear camera). This is, the region of interest associated to the front camera is closer to the bottom of the captured image of the front camera than the region of interest associated to the rear camera is to its respective bottom of the captured image of the rear camera.

Preferably, a distance between a geometric center of the second region of interest and an upper edge of the second captured image (i.e., associated to the front camera) may be at least 1.2 greater than a distance between a geometric center of the fourth region of interest and an upper edge of the fourth captured image (i.e., associated to the rear camera). More preferably, 1.3 greater, and even more preferably, 1.5 greater.

It should be pointed out that the ROI of the left camera is preferably not centered, but it is displaced to the left. More preferably, the ROI of the right camera is lightly placed to the right side than the ROI of the left camera.

It is preferred that the at least one controller comprises a composite image processor and a control unit for each camera. As explained above, the composite image processor is arranged in the vehicle out of the plurality of cameras and electrically connected to the cameras such that, in use, data (i.e., including image data) may be sent from the composite image processor to the cameras and vice-versa. Each of the control unit being different from the composite image processor.

More preferably, the control unit of the camera, in turn, may include an image signal processor or ISP. It is even more preferred that the electrically connection between the composite image processor and the control units is done through a communication interface, the communication interface being a CAN bus, a LIN bus, ethernet, an optical fiber communication, a wireless interface, a LVDS, or coaxial. Preferably, the composite image processor may be configured to receive and combine at least the first captured image and the second captured image for providing the composite image.

Furthermore, the composite image processor may be further configured to define the first region of interest within the first captured image and the second region of interest within the second captured image. More preferably, the composite image processor may be configured to define the first, second, third and fourth regions of interest within the respective first, second, third, and fourth captured images.

The control unit of the first camera may preferably detect the brightness and/or color of at least the first region of interest before being combined. Further, the control unit of the second camera may preferably detect the brightness and/or color of at least the second region of interest before being combined. More preferably, the control unit of the third camera may preferably detect the brightness and/or color of at least the third region of interest; and the control unit of the fourth camera may preferably detect the brightness and/or color of at least the fourth region of interest.

The brightness and/or color of at least the first region of interest may preferably be adjusted before being combined. For example, a composite image processor, based on the initial parameters defined offline and the saved ROI inputted on the composite image processor associated to each camera prior to or during the assembly line of vehicle, sends them to the camera, so that it auto-configures itself.

Further, the control unit of the second camera may preferably adjust the brightness and/or color of at least the second region of interest before being combined. More preferably, the control unit of the third camera may preferably adjust the brightness and/or color of at least the third region of interest before being combined; and the control unit of the fourth camera unit may preferably adjust the brightness and/or color of at least the fourth region of interest before being combined.

Due to these features, the top view has a uniform appearance because the brightness and/or color of the individual images is substantially the same due to the adjusting step.

Advantageously, the at least one controller also defines a region of interest for each camera, including each region of interest substantially only the surroundings of the vehicle. This entail that the regions of interest do not include any portion, or just a little portion, of the chassis of the vehicle, which is a source of undesirable light effects that affect the brightness and/or color of the image, also preventing differences among vehicles with the same camera integration, but with a different color of the chassis.

Therefore, the adjustment of the brightness and/or color of the images requires a reduced processing time, considering that the top view is continuously generated, creating a video and not a still view.

The definition of the region of interest is preferably done just once and individually for each camera and each vehicle, usually at the vehicle factory or before.

According to a second aspect, the present invention also refers to a method for providing a composite image of a vehicle (i.e., a top view of a vehicle and its surroundings), comprising the following steps:

determining the size and the location of at least a first region of interest within a first captured image and a second region of interest within a second captured image;

saving the at least first and second regions of interest on the at least one controller, preferably, on the composite image processor, more preferably, this step is performed out of the operation of the vehicle (OFF state of the vehicle), for example, prior to or during the assembly vehicle line (offline);

taking, preferably during the operation of the vehicle (online), an image of each of a plurality of cameras, wherein a first camera may acquire a first captured image and a second camera may acquire a second captured image, the first captured image and the second captured image being at least partially overlapped;

determining, preferably by a control unit of the first camera and the second camera, the brightness and/or color of at least the first and second region of interest, preferably, during the operation of the vehicle (online);

adjusting, preferably by the control unit of the first and second camera, the brightness and/or color of at least the first and second captured image, preferably, during the operation of the vehicle (online); and combining, preferably by a composite image processor arranged out of the cameras, the images from the plurality of cameras (1, 2, 3, 4) for forming a composite image of a vehicle, preferably, during the operation of the vehicle (online).

The method according to the present invention also comprises preferably the step of determining a region of interest on each of a plurality of cameras, including each region of interest substantially only the surroundings of the vehicle.

The region of interest is preferably defined only once by coordinates, these coordinates being fixed after their definition.

Furthermore, the brightness and/or color of each of the images taken by the plurality of cameras is only adjusted for the region of interest of each image.

According to a preferred embodiment, the brightness is adjusted by the automatic exposure control (AEC)/automatic gain control (AGC) and the color is adjusted by the automatic white balance (AWB).

BRIEF DESCRIPTION OF THE DRAWINGS

For better understanding of what has been disclosed, some drawings in which, schematically and only by way of a non-limiting example, a practical case of embodiment is shown.

Figures 2A, 2B, 2C, 2D:
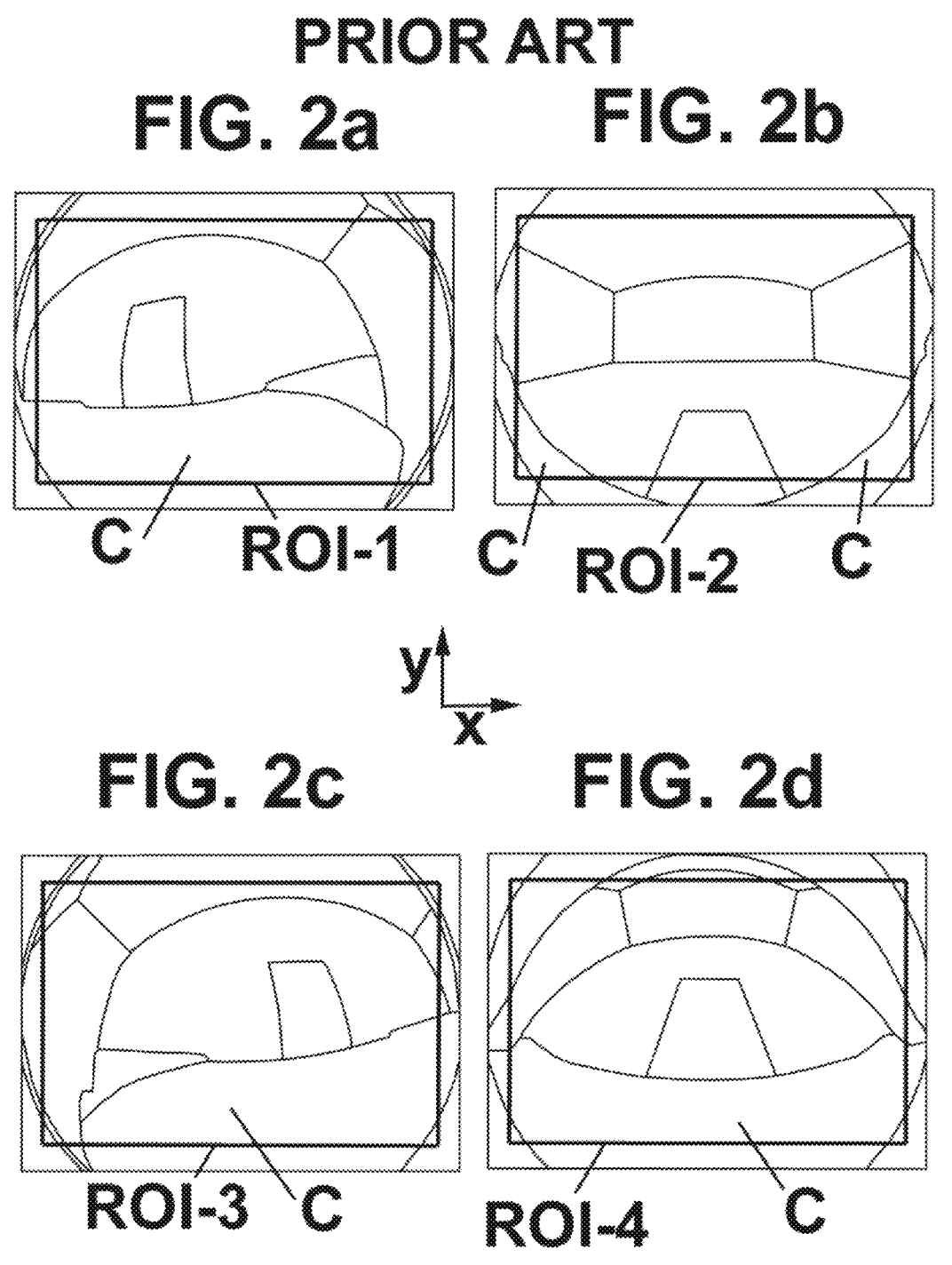

FIGS. 2*a*-2*d* show, respectively, the left, frontal, right and rear views taken by a system for providing a top view of a vehicle and its surroundings, according to the prior art.

DETAILED DESCRIPTION

Figure 1:
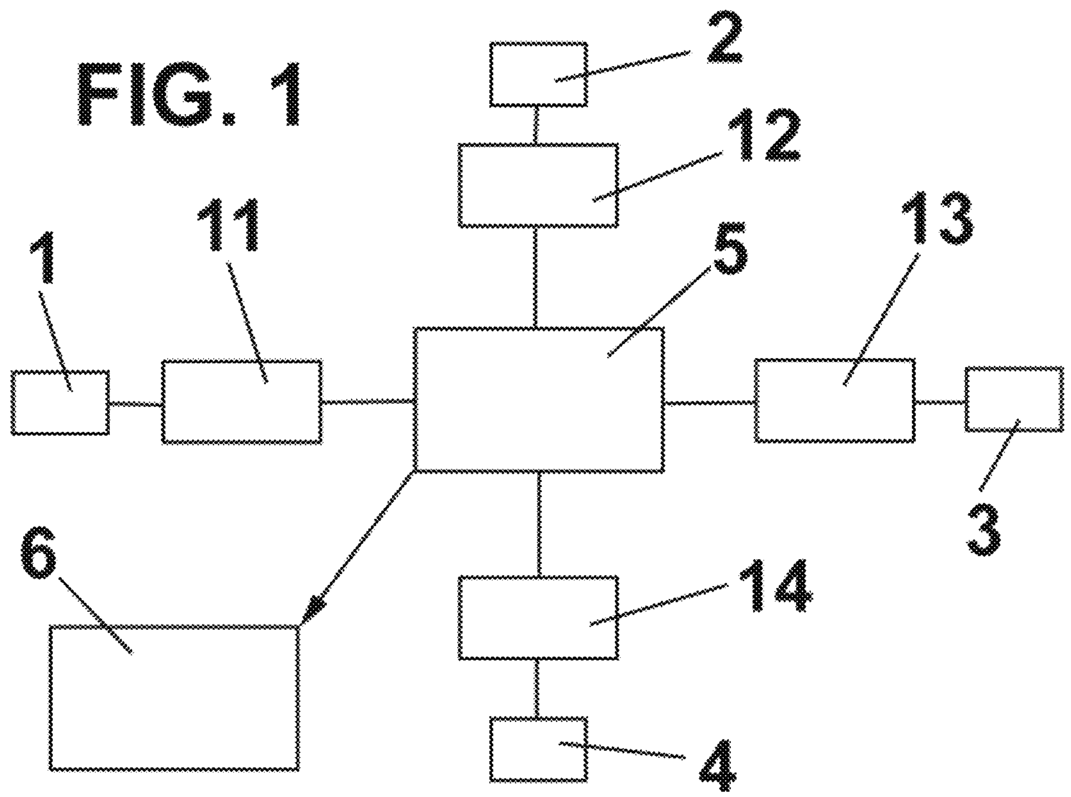
FIG. 1 is a block diagram of the elements forming part of the system according to the present invention.
Figures 3A, 3B, 3C, 3D:
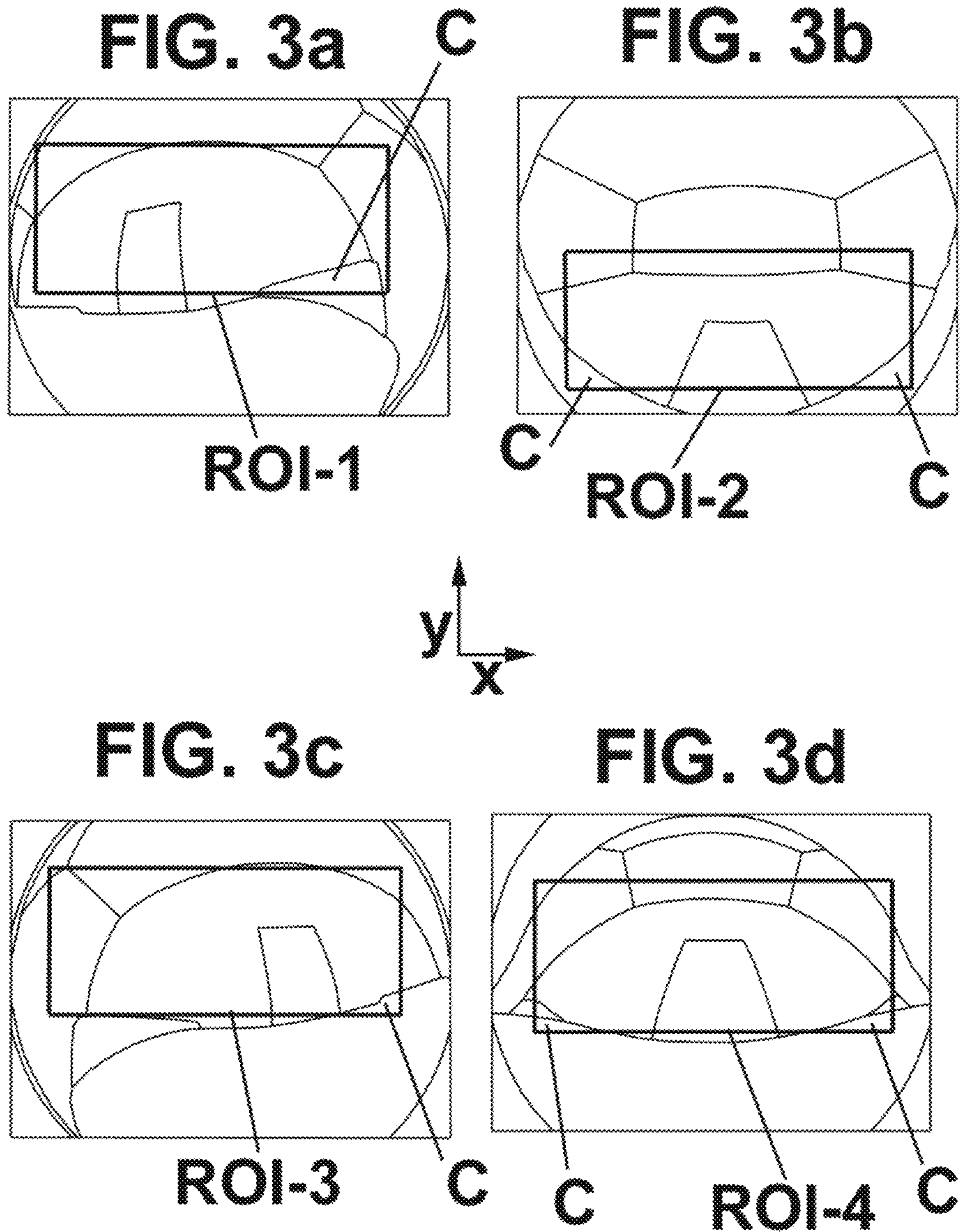
FIGS. 3*a*-3*d* show, respectively, the left, frontal, right, and rear views taken by the system according to the present invention.

The system according to the present invention is shown as a block diagram in FIG. 1 and it comprises a plurality of cameras.

According to this embodiment, the cameras are four, for a top view: a left camera (1), a front camera (2), a right camera (3), and a rear camera (4). Each camera (1, 2, 3, 4) takes an image of the surroundings of the vehicle. However, the number of cameras can be changed according to the requirements of the composite image.

Each camera (1, 2, 3, 4) takes a captured image of the surroundings of the vehicle, and at least some of the captured images are at least partially overlapped.

The system according to the present invention also comprises at least one controller that is configured to receive and combine at least some of the captured images for providing the composite image that is shown on a screen (6) placed inside the vehicle.

It is pointed out that the at least one controller comprises a plurality of controllers (two or more controllers), in particular, in the embodiment shown in FIG. 1, the at least one controller comprises a central controller (5) of the surrounding view system usually called as Electronic Control Unit (ECU) of the top-view system, and a controller for each of the cameras, shown with numeral references 11, 12, 13, 14 in the drawings, that may include an Image Signal Processor (ISP).

In each of the images taken by the cameras (1, 2, 3, 4) a Region Of Interest (ROI-1, ROI-2, ROI-3, ROI-4) is selected for each vehicle, preferably at or prior to the vehicle factory (offline). These ROIs are the portion of the captured image that is used to detect the brightness and/or color and to adjust the brightness and/or color of at least the first, second, third, and fourth captured images before being combined, by the composite image processor (5), for providing the top view.

As explained, the disclosed system, among other things, detects the brightness and/or color of the regions of interest (ROI-1, ROI-2, ROI-3, ROI-4) for adjusting the brightness and/or color of the captured images before being combined. In particular, the first control unit is configured to detect the brightness and/or color of the first region of interest (ROI-1) such that, in use, the brightness and/or color of the first captured image is adjusted before being combined, for example, by the composite image processor. Further, the second control unit is configured to detect the brightness and/or color of the second region of interest (ROI-2) such that, in use, the brightness and/or color of the second captured image is adjusted before being combined, for example, by the composite image processor. Also, the third control unit is configured to detect the brightness and/or color of the third region of interest (ROI-3) such that, in use, the brightness and/or color of the third captured image is adjusted before being combined, for example, by the composite image processor. Furthermore, the fourth control unit is configured to detect the brightness and/or color of the fourth region of interest (ROI-4) such that, in use, the brightness and/or color of the fourth captured image is adjusted before being combined, for example, by the composite image processor.

It must be pointed out that the system, according to the present invention, is activated by the user or driver of the vehicle, manually, e.g., by a button or the like, or automatically when the driver puts the vehicle in reverse gear.

FIGS. 2*a*-2*d* show, respectively, the left, front, right, and rear views taken by a system of a vehicle, according to the prior art.

In these figures, the ROIs include the chassis zones (C) that are captured by the cameras (1, 2, 3, 4).

As shown in these FIGS. 2*a*-2*d* according to the prior art, the ROIs also include a major portion of the chassis (C) of the vehicle, that have an influence with the ambient conditions, such as brightness and color that affect the top view shown in the screen (6) of the vehicle. Typically, as can be seen in FIGS. 2*a*-2*d*, prior art discloses four regions of interest (one for each camera) each arranged substantially on the center of the respective captured image, where approximately 40%-60% of the region of interest of at least the front and the rear captured images corresponds to a portion of the vehicle (e.g., a chassis or any exterior surface of the vehicle). As explained, it unfortunately causes a composite image (e.g., a single top view image) with different color and/or luminosities.

According to the present invention, and as shown in FIGS. 3*a*-3*d*, the selected ROIs include substantially only the surroundings of the vehicle, i.e., they include just a little portion of the chassis (C), or no portion of the chassis (C), as it is described in more detail hereinafter.

In particular, the regions of interest (ROI-1, ROI-2, ROI-3, ROI-4) are different to each other in size and/or location, and the size, shape and location of the regions of interest (ROI-1, ROI-2, ROI-3, ROI-4) are pre-defined out of the operation of the vehicle, more in particular, determined and saved in the composite image processor (5).

In use, the regions of interest (ROI-1, ROI-2, ROI-3, ROI-4) are invariable in size and/or location during the operation of the vehicle (online), and each region of interest can be defined by coordinates (x, y), these coordinates being fixed after their definition by the composite image processor (5), and they are, in particular, determined, saved, and fixed in size and/or location prior to or during the assembly line of the vehicle (offline).

For example, at least 70% of at least one of the regions of interest include the surroundings of the vehicle, and less than 30% of at least one of the regions of interest includes a portion of the vehicle.

For example, the regions of interest have a size of between 25%-80% of the captured image, in particular, a size of between 30%-60% of the captured image. As shown in FIGS. 3*a*-3*d*, the size of the first, second, third, and fourth captured images is of between 35%-55% of the first, second, third, and fourth captured images respectively.

As stated previously, in the case of the system according to the present invention, the ROIs are selected, preferably at or prior to the vehicle factory (offline) considering not to include any portion of the chassis (C) of the vehicle, or at least, a reduced portion of the chassis (C). Therefore, the chassis (C) may have no, or a reduced, impact on the brightness and/or color of the images taken by the cameras (1, 2, 3, 4).

When selecting the ROIs, the x, y coordinates are determined for each ROI for each camera, and these x, y coordinates are saved and fixed, i.e., they are not changed after a first step for determining each ROI for each camera. In other words, according to a preferred example, the x, y coordinates are determined and saved on the image composition processor in offline and remain unchangeable in online. As shown in FIGS. 3*a*-3*d*, each ROI for each camera is rectangular, but other geometries are of course not ruled out. In the shown example, the x, y coordinates are the horizontal (x) and vertical (y) position of each of the vertices of the rectangle. Other types of coordinates of course may be used to pre-define the regions of interest.

As shown in FIGS. 3*a*-3*d*, the distance between a geometric center of the second region of interest (ROI-2) and a bottom edge of the second captured image is smaller than the distance between a geometric center of the fourth region of interest (ROI-4) and a bottom edge of the fourth captured image, for example, the distance between a geometric center of the second region of interest (ROI-2) and an upper edge of the second captured image is at least 1.2 greater than the distance between a geometric center of the fourth region of interest (ROI-4) and an upper edge of the fourth captured image. This entails that the position and size each ROI can be adapted to include substantially only the surroundings of the vehicle.

When the user activates the system according to the present invention, the control unit(s) (11, 12, 13, 14), in particular, the ISPs of each camera (1, 2, 3, 4) adjusts the brightness and/or color of the images taken by the cameras.

These images adjusted by the control unit(s) are the images that are combined by the composite image processor to each other for generating the top view that is shown on the screen (6) of the vehicle.

According to examples, this combination of the images includes a perspective correction (e.g., from top-to-down) that is carried by any way know in the art, such as a mapping between two planar projections of an image, and it can be represented by a 3×3 transformation matrix in a homogeneous coordinate space such as, for example, a "homography matrix".

In certain preset situations, e.g., by user interacting with a human-machine interface (HMI) (e.g., the reverse gear is engaged), he/she instructs to activate the top view (surrounding view) system, such that, in use, the top view system is displayed automatically on the screen with very little delay. That is, a controller is further configured to activate the plurality of camera (1, 2, 3, 4) and to acquire the captured images upon a signal from the human-machine interface (HMI). In examples, the communication between the human-machine interface (HMI) and the controller may be a direct communication or not (i.e., intermediate elements/controllers electrically connected therebetween) is carried out by at least one of a CAN bus, a LIN bus, Ethernet, an optical fiber communication, a wireless, a LVDS, and a coaxial interface.

Of course, these steps are carried out continuously, so that the images shown on the screen (6) are not still images, but a video.

According to the shown example, the first, second, second, third and fourth cameras (1, 2, 3, 4) send their captured images (e.g., video at a frame rate of at least 15 frames per second (fps), particularly, at 30 fps or higher) to the composite image processor through the above-mentioned communication interface, the composite image processor being further configured to process an image that is called "top view".

Optionally, once the top view has been obtained, but before displaying it on the screen (6), there can be other image processing steps, for example, detection of lines on the ground, detection of objects outside and near the vehicle (pedestrians, cars, or motorcycles nearby), detection of signals (traffic signals), etc.

More optionally, the lines to be detected are especially parking lines, in which free spaces of parking places can be determined.

Due to the proposed solution, it is possible to provide a system for vehicles that provides a top view with an improved brightness and/or color adjustment of the image, and thus achieving a surrounding or top view with a harmonized or constant brightness and/or color.

Although reference has been made to specific embodiments of the invention, it is apparent to a person skilled in the art that the described system and method are susceptible of numerous variations and modifications, and that all the details mentioned can be replaced by other technically equivalents, without departing from the scope of protection defined by the appended claims.

What is claimed is:

1. A system for providing a composite image of a surrounding area of a vehicle, comprising:

a plurality of cameras, each camera taking a captured image of the surrounding area of the vehicle, wherein a first camera is configured to acquire a first captured image, and a second camera is configured to acquire a second captured image, the first captured image and the second captured image being at least partially overlapped;

at least one controller is configured to receive and combine at least the first captured image and the second captured image for providing the composite image, wherein the at least one controller comprises a first control unit inside of the first camera and a second control unit inside of the second camera, a composite image processor is configured to define a first region of interest within the first captured image and a second region of interest within the second captured image; and wherein each of the at least one controller is further configured to detect a brightness and a color of the respective first region of interest and second region of interest and to adjust the brightness and the color of the respective first captured image to create an adjusted first captured image and to adjust the brightness and the color of the second captured image to create an adjusted second captured image before being combined, wherein the composite image processor is configured to receive and combine the adjusted first captured image and the adjusted second captured image for providing the composite image of the surrounding area of the vehicle, wherein the first region of interest is different from the second region of interest in size and location, wherein the first region of interest has a size of between 25%-80% of the first captured image, and the second region of interest has a size of between 25%-80% of the second captured image, wherein the size, shape, and location of the first region of interest and second region of interest are pre-defined when the vehicle is not in operation by the at least one controller, and wherein the first and second regions of interest include substantially only the surrounding area of the vehicle.

2. The system for providing the composite image of the surrounding area of the vehicle of claim 1 wherein the first region of interest and the second region of interest are fixed in size and location while the vehicle in in operation.

3. The system for providing the composite image of the surrounding area of the vehicle of claim 1 wherein the first region of interest and the second region of interest are defined by coordinates by the at least one controller.

4. The system for providing a composite image of a surrounding area of vehicle of claim 1 wherein at least 70% of the first region of interest and the second region of interest include the surrounding area of the vehicle.

5. The system for providing the composite image of the surrounding area of the vehicle of claim 1 wherein less than 30% of the first region of interest encompasses the vehicle and less than 30% of the second region of interest encompasses the vehicle.

6. The system for providing the composite image of the surrounding area of the vehicle of claim 1 wherein the first region of interest has a size of between 30%-60% of the first captured image and the second region of interest has a size of between 30%-60% of the second captured image.

7. The system for providing the composite image of the surrounding area of the vehicle of claim 1 wherein a third camera is configured to acquire a third captured image, and a fourth camera is configured to acquire a fourth captured image, the third captured image and the fourth captured image being at least partially overlapped;

at least one controller is configured to receive and combine at least the third captured image and the fourth captured image for providing the composite image, wherein the at least one controller comprises a third control unit inside of the third camera and a fourth control unit inside of the fourth camera, wherein the composite image processor is configured to define a third region of interest within the third captured image and a fourth region of interest within the fourth captured image; and wherein each of the at least one controller is further configured to detect a brightness and a color of the respective third region of interest and fourth region of interest and to adjust the brightness and the color of the respective third captured image to create an adjusted third captured image and to adjust the brightness and the color of the fourth captured image to create an adjusted fourth captured image before being combined, wherein the composite image processor is configured to receive and combine the adjusted third captured image and the adjusted fourth captured image for providing the composite image of the surrounding area of the vehicle, wherein the third region of interest is different from the fourth region of interest in size and location, wherein the third region of interest has a size of between 25%-80% of the third captured image, and the fourth region of interest has a size of between 25%-80% of the fourth captured image, wherein the size, shape, and location of the third region of interest and fourth region of interest are pre-defined when the vehicle is not in operation by the at least one controller, and wherein the third and fourth regions of interest include substantially only the surrounding area of the vehicle.

8. A system for providing a composite image of a surrounding area of a vehicle, comprising:

a plurality of cameras, each camera taking a captured image of the surrounding area of the vehicle, wherein a first camera acquires a first captured image, and a second camera acquires a second captured image, the first captured image and the second captured image being at least partially overlapped;

at least one controller receives and combines at least the first captured image and the second captured image provided to the composite image, wherein the at least one controller comprises a first control unit inside of the first camera and a second control unit inside of the second camera, a composite image processor defines a first region of interest within the first captured image and a second region of interest within the second captured image; and wherein each of the at least one controller is further configured to detect a brightness and a color of the respective first region of interest and second region of interest and to adjust the brightness and the color of the respective first captured image to create an adjusted first captured image and to adjust the brightness and the color of the second captured image to create an adjusted second captured image before being combined, wherein the composite image processor receives and combines the adjusted first captured image and the adjusted second captured image provided to the composite image of the surrounding area of the vehicle, wherein the first region of interest is different from the second region of interest in size and location, wherein the first region of interest has a size of between 25%-80% of the first captured image, and the second region of interest has a size of between 25%-80% of the second captured image, wherein the size, shape, and location of the first region of interest and second region of interest are pre-defined by the at least one controller when the vehicle is not in operation, and wherein the first and second regions of interest include substantially only the surrounding area of the vehicle.

9. A method for providing a composite image of a surrounding area of a vehicle, the method comprising:

capturing an image by each of a plurality of cameras, wherein a first camera acquires a first captured image, and a second camera acquires a second captured image, the first captured image and the second captured image being at least partially overlapped;

defining a first region of interest when the vehicle is not in operation having a size of between 25%-80% of the first captured image, and wherein the first region of interest includes substantially only a first portion of the surrounding area of the vehicle;

defining a second region of interest when the vehicle is not in operation having a size of between 25%-80% of the second captured image, and wherein the first region of interest includes substantially only a second portion of the surrounding area of the vehicle;

adjusting the at least one of the brightness and the color of the first region of interest of the first captured image to create a first adjusted image and adjusting the brightness and color of the second region interest of the second captured image to create a second adjusted image;

storing the first adjusted image and the second adjusted image in a composite image processor; and combining the first adjusted image and the second adjusted image to form a composite image of the surrounding area of the vehicle.

10. The method for providing the composite image of the surrounding area of the vehicle of claim 9 wherein the step of adjusting the at least one of the brightness and the color of the first region of interest of the first captured image is performed by a first control unit inside of the first camera to create a first adjusted image and the step of adjusting the brightness and color of the second region interest of the second captured image is performed by a second control unit inside of the second camera to create a second adjusted image.

11. The method for providing the composite image of the surrounding area of the vehicle of claim 9 wherein the step of adjusting the at least one of the brightness and the color of the first region of interest of the first captured image is performed by the controller in the composite image processor to create a first adjusted image and the step of adjusting the brightness and color of the second region interest of the second captured image is performed by a the controller in the composite image processor to create a second adjusted image.

* * * * *